United States Patent [19]

Murashima

[11] Patent Number: 4,967,279
[45] Date of Patent: Oct. 30, 1990

[54] AUTOMATIC FOCUSING CIRCUIT

[76] Inventor: Hirotsugu Murashima, 8-6 Katashio-cho, Yamatotakada-shi, Nara-ken, Japan

[21] Appl. No.: 58,910

[22] Filed: Jun. 5, 1987

[30] Foreign Application Priority Data

Jun. 13, 1986 [JP] Japan .................. 81-138910

[51] Int. Cl.⁵ .................. H04N 5/232; G03B 3/00
[52] U.S. Cl. .................. 358/227; 354/400; 354/402
[58] Field of Search .................. 354/400, 402; 358/227

[56] References Cited

U.S. PATENT DOCUMENTS

| | | | |
|---|---|---|---|
| 3,967,056 | 6/1976 | Yata et al. | 354/402 |
| 4,277,156 | 7/1981 | Fukushima et al. | 354/402 |
| 4,291,958 | 9/1981 | Frank et al. | 354/402 |
| 4,316,657 | 2/1982 | Suzuki et al. | 354/402 |
| 4,381,523 | 4/1983 | Eguchi et al. | 358/227 |
| 4,392,726 | 7/1983 | Kimura | 354/402 |
| 4,614,975 | 9/1986 | Kaite . | |
| 4,638,364 | 1/1987 | Hiramatsu . | |
| 4,647,979 | 3/1987 | Urata | 358/227 |
| 4,684,995 | 8/1987 | Baumeister | 354/402 |

FOREIGN PATENT DOCUMENTS

| | | |
|---|---|---|
| 58-505 | 4/1983 | Japan . |
| 11037776 | 6/1985 | Japan . |
| 135712 | 9/1985 | Japan . |

Primary Examiner—Russell E. Adams

[57] ABSTRACT

An automatic focusing circuit in a video camera separates a high frequency component from the video signal obtained in an image sensing circuit 4 for every field. After the separated high frequency component is integrated in an integration circuit 10, the result is converted into a digital value by an A/D converter 11 and is applied to a holding circuit 12 as a focus evaluating value. The holding circuit 12, which comprises first to fifth memories coupled in series, always holds the newest successive five focus evaluating values. The largest focus evaluating value is detected by the maximum value detecting circuit 18 for every field and is applied to a memory 19. The maximum value is compared with the maximum value one field before held in a memory 20 in a comparator circuit 21. If the newest maximum value in the memory 19 is decreased, a focusing motor control circuit 22 inverts the rotational direction of the focusing motor 3. Thus, since the focusing ring is slightly vibrated in the maximal point of the maximum value of the detected focus evaluating value, a focusing lens can be held in the in-focus position.

38 Claims, 4 Drawing Sheets

FIG.2
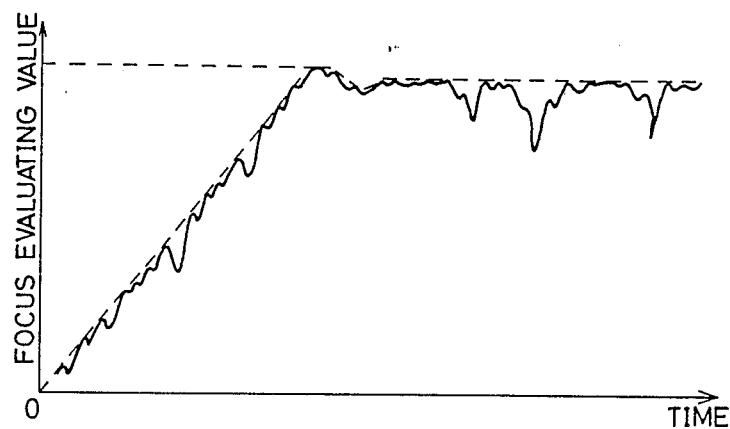
FIG.3A
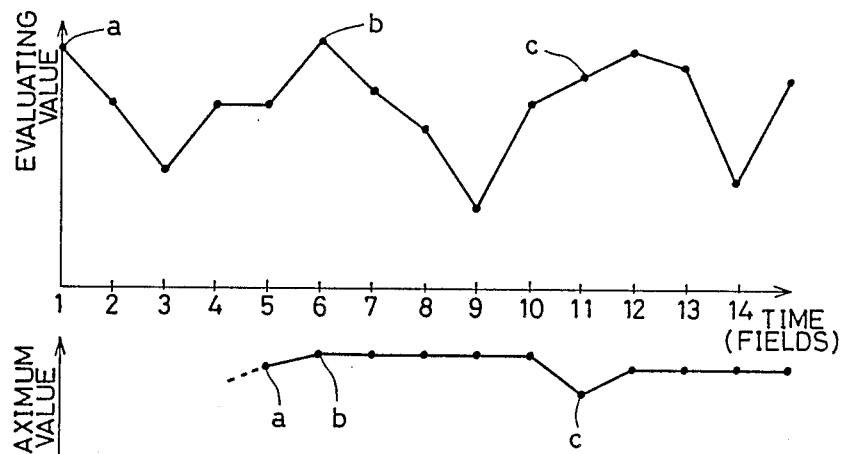
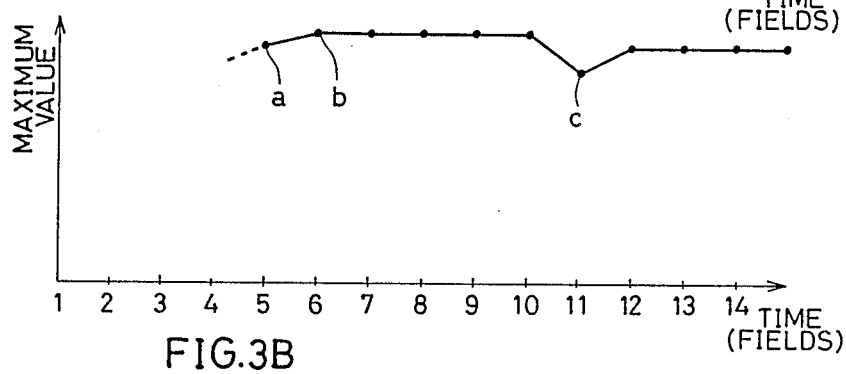
FIG.3B

AUTOMATIC FOCUSING CIRCUIT

BACKGROUND OF THE INVENTION

1. Field of the Invention

The present invention relates to an automatic focusing circuit and more particularly, to an improvement of an automatic focusing circuit in a video camera for automatically matching the focus in response to a video signal obtained from an image sensor.

2. Description of the Prior Art

Conventionally, in an automatic focusing apparatus for a video camera an approach utilizing a video signal itself obtained from an image sensor for evaluating the state where the focus is controlled has been developed. According to such an approach, many good characteristics can be obtained. For example, there exists essentially no parallax. In addition, even if the depth of field is small and an object is located in the distance, the focus can be exactly matched. Furthermore, according to this method, a specific sensor for automatic focusing need not be separately provided, so that the apparatus is very simple as a mechanism.

The automatic focusing circuit according to the above described method controls a focusing motor basically utilizing a control method referred to as a hill-climbing servo system. Such a hill-climbing servo system is disclosed in, for example, U.S. Pat. No. 4,638,364, U.S. Pat. No. 4,614,975, Japanese Patent Laying-Open Gazette No. 58505/1983 and No. 103776/1985. Briefly stated, a high frequency component of the video signal obtained from the image sensor is detected every one field as a focus evaluating value, the detected current focus evaluating value is always compared with a focus evaluating value detected one field before, and a focusing ring continues to be slightly vibrated so that the newest focus evaluating value may always take the maximal value, that is, maintain the in-focus state.

Furthermore, Japanese Utility Model Laying-Open Gazette No. 135712/1985 disloses a system for detecting the maximal value where the focus evaluating value is changed from an increasing tendency to a decreasing tendency while driving the focusing ring in a one-way direction, determining that the position corresponding to the maximal value is the in-focus position, and returning the focusing ring to the position and stopping the same.

As described in the foregoing, according to the conventional automatic focusing technique, control is performed such that the focus evaluating value in the current field is directly compared with the focus evaluating value one field before and the focusing ring is inverted or stopped if the focus evaluating value in the current field is decreased. Therefore, when the camera and the object are at rest in actually using the video camera to record an image, good automatic focusing operation can be expected.

However, when either of the camera itself or the object moves, the focus evaluating value varies irrespective of the degree of matching the focus. Particularly, in the case of so-called "unintentional movement of a camera" caused by unintentional movement of the hands and so-called "unintentional movement of an object" caused by abrupt movement of the object, there occurs the following problem. More specifically, "unintentional movement" occurs since an image of the object in the imaging surface of the image sensor moves within an exposure time (1/60 sec. or 1/30 sec. in the normal video camera). As a result, fine patterns of the object are blurred and the high frequency component of the video signal is decreased, so that it is impossible to distinguish the object similarly to the defocused state. Thus, when such "unintentional movement" occurs, the focus evaluating value is temporarily and largely decreased irrespective of whether the in-focus state is actually achieved or not. Therefore, according to the above described conventional automatic focusing technique, such temporary decrease in the focus evaluating value is determined as the defocused state, so that unnecessary rotation of the focusing ring is occurred or the focusing ring is stopped in the position other than the true maximal value, that is, the in-focus position. Such wrong motions of focusing ring of this kind causes a great difficulty in actually recording an image. In addition, in the above described method for stopping the focusing ring in the position corresponding to the maximal point, the focus evaluating value may be decreased due to the above described unintentional movement in spite of the in-focus state. In such a case, such decrease in the focus evaluating value is determined as the defocused state, so that driving of the focusing ring is resumed, resulting in unclear picture due to such unnecessary movement.

SUMMARY OF THE INVENTION

Therefore, a primary object of the present invention is to provide an automatic focusing circuit in which malfunction in automatically controlling the focus can be prevented and a good image can be obtained even if there occurs unintentional movement of a camera itself or an object.

Briefly stated, the present invention provides an automatic focusing circuit for automatically matching the focus in response to a video signal obtained from an image sensor, the automatic focusing circuit comprising focus evaluating value detecting means for detecting a level of a high frequency component of a video signal obtained from an image sensor every constant period, converting the level into a focus evaluating value which takes the maximum value in the in-focus position or a focus evaluating value which takes the minimum value in the in-focus position and sequentially supplying the same, first holding means connected to the focus evaluating value detecting means for holding a plurality of focus evaluating values successively obtained every constant period, maximum value/minimum value detecting means for detecting the maximum value or the minimum value of the plurality of successive focus evaluating values held in the fist holding means, and focus controlling means responsive to an output of the maximum value/minimum value detecting means for controlling the focus.

In accordance with another aspect of the present invention, the first holding means successively holds a plurality of the newest focus evaluating values obtained every constant period.

In addition, in accordance with another aspect of the present invention, the maximum value/minimum value detecting means detects the maximum value or the minimum value for every constant period as described above.

Furthermore, in accordance with another aspect of the present invention, the focus controlling means comprises second holding means for holding the newest successive two detected values of outputs of the maximum value/minimum value detecting means obtained every constant period, first comparing means for comparing the two detected values held in the second holding means, and means for detecting inversion of an output of the first comparing means and controlling the focus.

Additionally, in accordance with another aspect of the present invention, the focus controlling means comprises third holding means connected to the focus evaluating value detecting means for holding the newest successive two values of the focus evaluating values obtained every constant period, second comparing means for comparing two focus evaluating values held in the third holding means, means for detecting inversion of an output of the second comparing means and interrupting focus controlling, fourth holding means in synchronization with detection of inversion of the output of the second comparing means for holding the focus evaluating value at that time, third comparing means for comparing the newest detected value of the outputs of the maximum value/minimum value detecting means obtained every constant period with the focus evaluating value held in the fourth holding means and comparing the difference with a predetermined threshold value, and means for determining that the above described difference exceeds a predetermined threshold value and resuming controlling the focus.

Additionally, in accordance with another aspect of the present invention, the focus controlling means comprises fifth holding means for holding the newest successive two detected values of the outputs of the maximum value/minimum value detecting means obtained every constant period, fourth comparing means for comparing the two detected values held in the fifth holding means, means for detecting inversion of an output of the fourth comparing means and interrupting focus controlling, sixth holding means in synchronization with detection of inversion of the output of the fourth comparing means for holding an output at that time of the maximum value/minimum value detecting means, fifth comparing means for comparing the newest detected value of the outputs of the maximum value/minimum value detecting means obtained every constant period with the focus evaluating value held in the sixth holding means and comparing the difference with a predetermined threshold value, and means for determining that the above described difference exceeds the predetermined threshold value and resuming controlling the focus.

A principal advantage of the present invention is that since a plurality of focus evaluating values successively obtained every constant period are stored over a longer period than the period of unintentional movement, the maximum value or the minimum value therein is detected and the focus is controlled in response to the detected value, temporary variation of the focus evaluating value caused by unintentional movement can be prevented from affecting operation for automatically controlling the focus.

Another advantage of the present invention is that the in-focus state can be successfully maintained, since the newest successive two detected values of the maximum value or the minimum value of the focus evaluating value detected every constant period are always compared and the maximal point is detected.

Additionally, another advantage of the present invention is that when the detected newest maximum value or the minimum value of the focus evaluating value varies by a predetermined amount after focus controlling is temporarily interrupted in the in-focus state, focus controlling can be resumed.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a waveform diagram for explaining operation of the embodiment shown in FIG. 1;

FIGS. 3A and 3B are waveform diagrams for explaining operation of the embodiment shown in FIG. 1;

DESCRIPTION OF THE PREFERRED EMBODIMENTS

Figure 1:
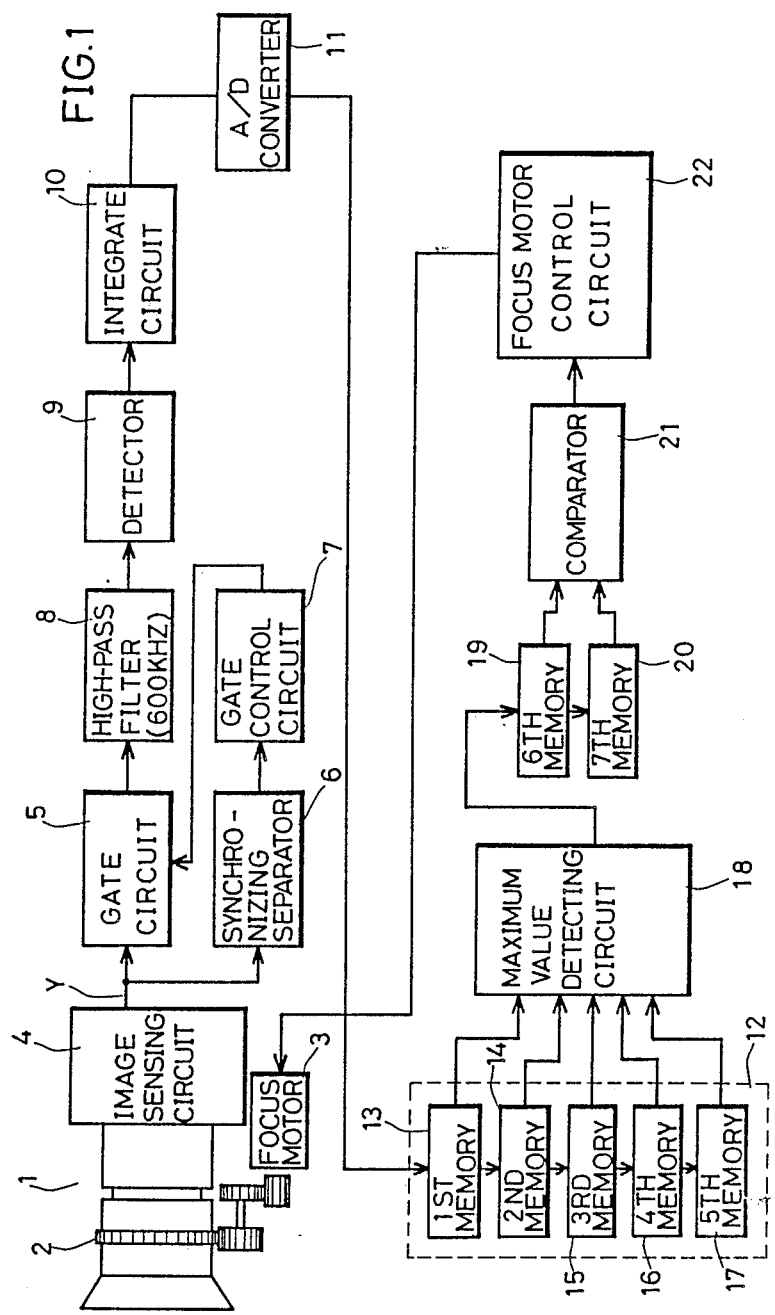
FIG. 1 is a schematic block diagram showing an automatic focusing circuit according to a first embodiment of the present invention.

FIG. 1 is a schematic block diagram showing an automatic focusing circuit according to a first embodiment of the present invention.

Referring now to FIG. 1, description is made on a structure of the automatic focusing circuit according to the first embodiment of the present invention.

In FIG. 1, a video camera 1 comprises a focusing ring 2 for moving a focusing lens (not shown), a focusing motor 3 for driving the focusing ring 2, and an image sensing circuit 4 including an image sensor (not shown) such as a CCD (Charge Coupled Device). The focusing lens can be moved by a piezoelectric element in place of the motor. In addition, the image sensor itself such as the CCD instead of the focusing lens may be moved.

A luminance signal component Y in a video signal obtained by the image sensing circuit 4 including the image sensor is applied to a gate circuit 5 and a synchronizing separator circuit 6. The synchronizing separator circuit 6 separates a vertical synchronizing signal VD and a horizontal synchronizing signal HD from the inputted luminance signal Y and applies the same to a gate control circuit 7. The gate control circuit 7 sets a rectangular sampling area in a central portion of a picture in response to the inputted vertical synchronizing signal VD and the horizontal synchronizing signal HD and an fixed output of an oscillator (not shown). The gate control circuit 7 applies a signal for opening and closing a gate every field to the gate circuit 5 so that passage of the luminance signal Y is permitted only in the range of the sampling area. The gate circuit 5 may be provided anywhere in the former stage of an integration circuit 10 as described below.

Only the luminance signal Y corresponding to the range of the sampling area is applied to a high-pass filter 8 which permits passage of signals over, for example, 600 kHz by the gate circuit 5. The high frequency component of the video signal separated by the high-pass filter 8 is amplitude-detected by a detector 9, the detected output being applied to the integration circuit 10 serving as focus evaluating value detecting means. The integration circuit 10 integrates for every field the detected output applied thereto, the integrated output being applied to an A/D converter 11. The A/D converter 11 converts the integrated value applied thereto into a digital value and supplies the digital value as a focus evaluating value in the current field. The supplied focus evaluating value is applied to a focus evaluating value holding circuit 12.

The focus evaluating value holding circuit 12 comprises first to fifth memories 13, 14, 15, 16 and 17 which are coupled in series. Every time a new focus evaluating value is applied from the A/D converter 11 to the focus evaluating value holding circuit 12, data stored in the memories are simultaneously transferred, for example, from the first memory 13 to the second memory 14, and from the second memory 14 to the third memory 15, so that old data stored in the fifth memory 17 is disregarded. Thus, a focus evaluating value in the current field, a focus evaluating value one field before, a focus evaluating value two fields before, a focus evaluating value three fields before, and a focus evaluating value four fields before are always held in the first memory 13, the second memory 14, the third memory 15, the fourth memory 16, and the fifth memory 17, respectively. The focus evaluating value holding circuit 12 actually comprises shift registers the number of which corresponds to the number of bits of an output of the A/D converter 11 arranged in parallel. According to the present embodiment, although data stored in the memories coupled in series are sequentially transferred, new focus evaluating values may be sequentially applied to a plurality of memories arranged in parallel.

Data stored in the first to fifth memories 13, 14, 15, 16 and 17 are supplied to a maximum value detecting circuit 18, the maximum value detecting circuit 18 detecting the maximum value of the applied five data and applying the same to a sixth memory 19. In addition, data held in the sixth memory 19 one field before is delayed and stored in a seventh memory 20, and data stored in the sixth memory 19 and the seventh memory 20 are applied to a first comparator circuit 21 and are compared therein. An output of the first comparator circuit 21 is applied to a focus motor control circuit 22. The memories 19 and 20, the comparator circuit 21 and the focus motor control circuit 22 constitute controlling means.

At the time of starting, the moving direction of the focus lens in which the focus evaluating value approaches the maximal value is determined by detecting means (not shown), the focusing motor control circuit 22 rotating and driving the focusing motor 3 in a one-way direction so that the focusing lens may be moved in the detected direction. Therefore, when data stored in the sixth memory 19 is larger than that stored in the seventh memory 20, the focus motor control circuit 22 rotates the focusing motor 3 in the above described one-way direction. When it is determined by the first comparator circuit 21 that data stored in the sixth memory 19 is smaller than that in the seventh memory 20, the focusing motor which rotates in the one-way direction as described above is inverted. The focusing ring is slightly vibrated in the vicinity of the maximal value of the focus evaluating value by the above described well-known hill-climbing control, so that the focusing lens is held in the in-focus position.

FIGS. 2, 3A and 3B are waveform diagrams for explaining operation of the embodiment shown in FIG. 1.

Referring now to FIGS. 1 to 3B, description is made on operation of the first embodiment of the present invention. FIG. 2 is a waveform diagram for schematically showing the relation between the time from the time when focus controlling is started and a focus evaluating value (an output of the A/D converter 11) in the automatic focusing circuit shown in FIG. 1, where the axis of abscissa represents the time (the number of fields) and the axis of ordinate represents the focus evaluating value. In FIG. 2, a broken line represents the relation when the above described unintentional movement does not occur, and an solid line represents the relation when unintentional movement occurs in actually sensing an image. In FIG. 2, after the focus evaluating value first attains the maximal value, the focusing lens should be normally held in the in-focus position. However, since unintentional movement actually occurs, the focus evaluating value may be temporarily and largely decreased as shown by the solid line irrespective of whether the in-focus state is achieved or not. In such a case, according to the conventional technique as described above, malfunction occurs in controlling the focus. FIG. A is a graph of broken lines in which the solid line in FIG. 2 is partially enlarged and the focus evaluating value (the output of the A/D converter 11) detected every one field is plotted. FIG. 3B is a graph of broken lines in which an output of the maximum value detection circuit 18 in FIG. 1 is plotted every one filed on the same time base as FIG. 3A. In FIG. 3A, the maximum value of the focus evaluating values detected in the first five fields (first to fifth fields) is represented by "a". Thus, at that time, the value represented by the above described "a" is selected and emerges from the maximum value detecting circuit 18, as shown in the fifth field in FIG. 3B. Then, in FIG. 3A, the maximum value of the focus evaluating values detected in the newest five fields (second to sixth fields) at the time point when one field is advanced is represented by "b". Thus, at this time, the value represented by the above described "b" is selected and emerges from the maximum value detecting circuit 18, as shown in the sixth field in FIG. 3B. Thereafter, the maximum value of the focus evaluating values in the newest five fields is always a constant value represented by "b" during the time period from the sixth field to the tenth field. Thus, in FIG. 3B, the value represented by the above described "b" emerges from the maximum value detecting circuit 18 during the time period from the sixth field to the tenth field. Then, in the eleventh field, the maximum value of the focus evaluating values in the newest five fields changes into the value represented by "c" in FIG. 3A. Thus, at that time, the value represented by the above described "c" is selected and emerges from the maximum value detecting circuit 18, as shown in the eleventh field in FIG. 3B. As clear from FIGS. 3A and 3B, according to the embodiment in FIG. 1, five successive focus evaluating values obtained every one field are stored during a longer period than the period of decrease of the focus evaluating value due to unintentional movement, that is, over five fields, the maximum value thereof is detected, and the focusing motor is controlled in response to the maximum value, so that temporary variation of the focus evaluating value caused by unintentional movement can be prevented from affecting focus controlling operation.

Figure 4:
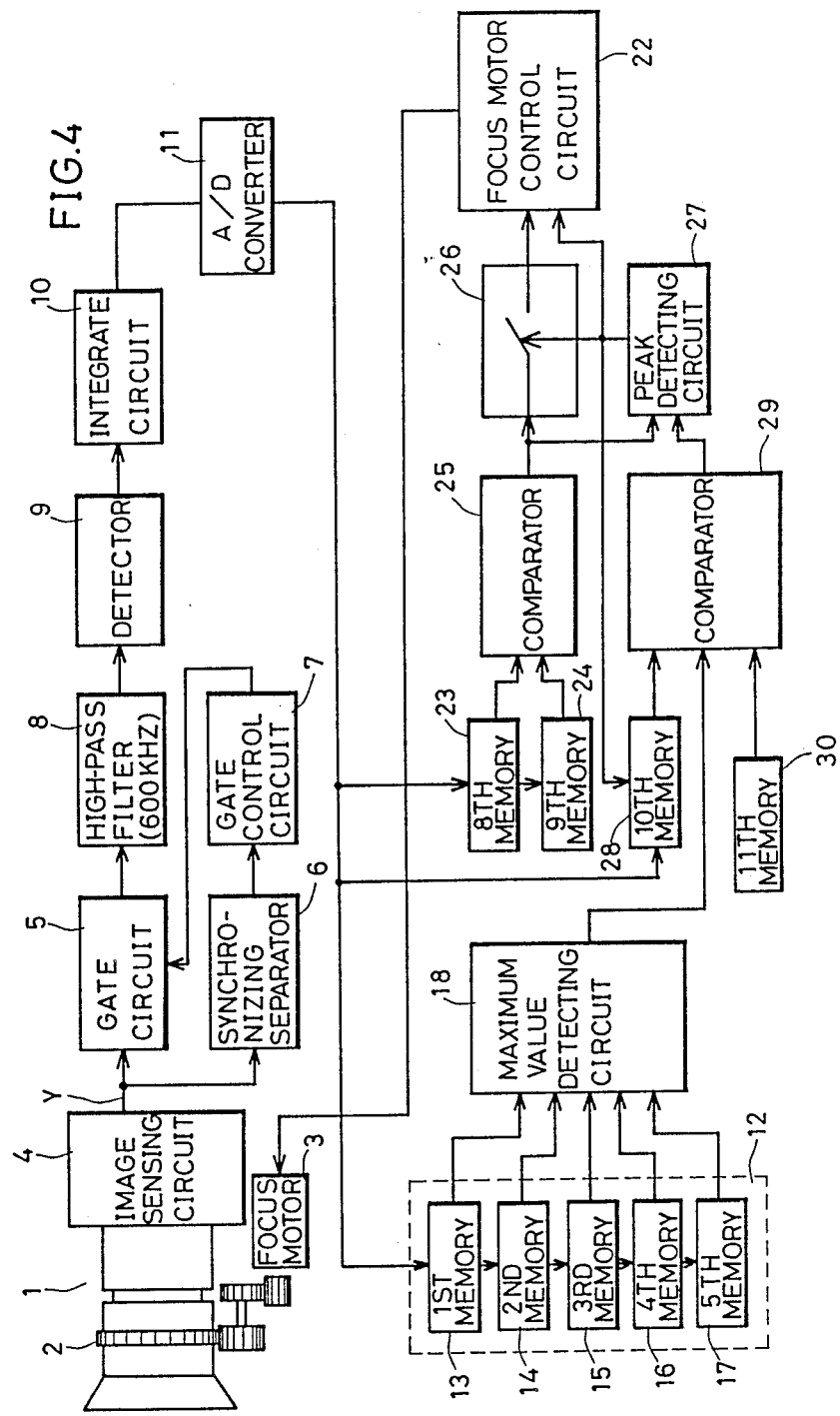
FIG. 4 is a schematic block diagram showing an automatic focusing circuit according to a second embodiment of the present invention.

FIG. 4 is a schematic block diagram showing the automatic focusing circuit according to a second embodiment of the present invention. The embodiment shown in FIG. 4 is the same as that shown in FIG. 1, except for the following. More specifically, the focus evaluating value produced by the A/D converter 11 is inputted to the first memory 13 of the focus evaluating value holding circuit 12 as in the embodiment shown in FIG. 1 and is also applied to an eighth memory 23. Data held in the eighth memory 23 one field before is delayed and is held in a ninth memory 24. Data stored in the eighth memory 23 and the ninth memory 24 are applied to a second comparator circuit 25 and are compared therein. In an initial state which continues to the time when it is determined by the comparator circuit 25 that the focus evaluating value attains the maximal value, a comparison output from the comparator circuit 25 is inputted to the focusing motor control circuit 22 through a gate circuit 26. Accordingly, the focusing motor 3 is driven in a one-way direction decided by the focusing motor control circuit 22. In such an initial state, the gate circuit 26 is maintained as closed.

Thereafter, when it is determined by a peak detecting circuit 27 that data stored in the ninth memory 24 is larger than that stored in the eighth memory 23, that is, passes the maximal value of the focus evaluating value, in response to the output of the comparator circuit 25, the peak detecting circuit 27 generates a peak detection signal and applies the same to the gate circuit 26 and the focusing motor control circuit 22. The gate circuit 26 is opened in response to the peak detecting circuit. In addition, the focusing motor control circuit 22 stops the focusing motor 3 in response to the peak detection signal and fixes the focusing ring 2 in the in-focus position. When the gate circuit 26 is opened, the comparison output of the comparator circuit 25 is inhibited from being subsequently applied to the focusing motor control circuit 22, so that hill-climbing control is not performed and the focusing ring 2 is held in the in-focus position.

Furthermore, the focus evaluating value at that time is stored in a tenth memory 28 from the A/D converter 11, in synchronization with the rising edge of the peak detection signal from the peak detecting circuit 27. The maximum value of the focus evaluating value obtained from the focus evaluating value holding circuit 12 and the maximum value detecting circuit 18 each having the same structure as that in Fig. 1, and the focus evaluating value held in the memory 28 are applied to a third comparator 29 where the data are compared. When the compared result exceeds a predetermined threshold value previously stored in a eleventh memory 30, it is determined that the object changed, so that the third comparator 29 applies a signal indicating that an object changes to the peak detecting circuit 27.

The peak detecting circuit 27 is reset by the signal indicating that an object changed, so that an output of the peak detection signal is inhibited. The gate circuit 26 is closed again, so that automatic focusing operation based on hill-climbing control is resumed by the focusing motor 22. More specifically, according to the embodiment in FIG. 4, unnecessary automatic focusing operation is prohibited even if the focus evaluating value is temporarily decreased due to unintentional movement.

Figure 5:
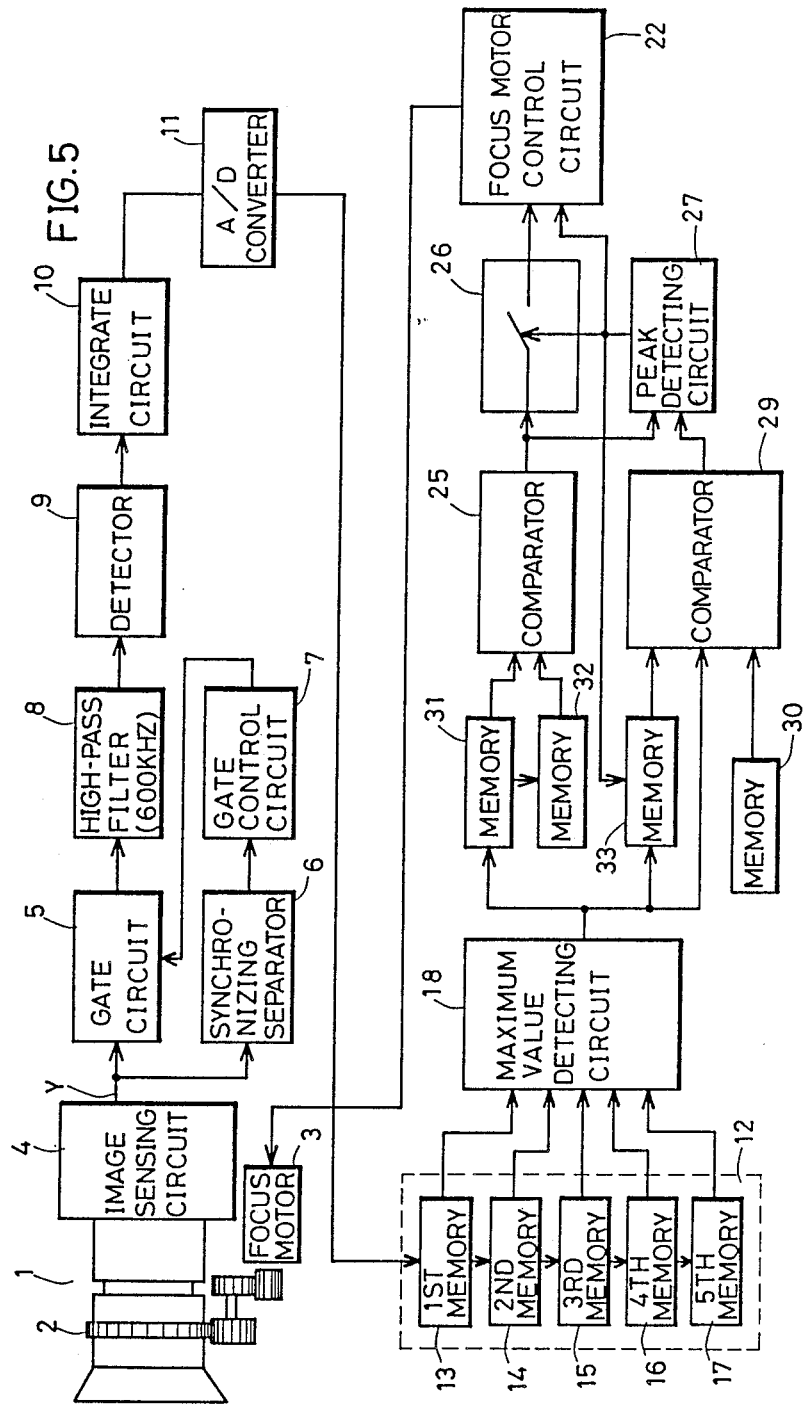
FIG. 5 is a schematic block diagram showing an automatic focusing circuit according to a third embodiment of the present invention.

FIG. 5 is a schematic block diagram showing the automatic focusing circuit according to a third embodiment of the present invention. The embodiment shown in FIG. 5 is the same as that shown in FIGS. 1 and 4, except for the following. More specifically, the output of the maximum value detecting circuit 18 is applied to the comparator 29 as in the embodiment shown in FIG. 4 and is also applied to a memory 31. Data held in the memory 31 one field before is delayed and is held in the memory 32. Data stored in the memories 31 and 32 are applied to the comparator circuit 25 and are compared therein. In an initial state which continues to the time when it is determined by the comparator circuit 25 that the focus evaluating value attains the maximal value, the output of the comparator circuit 25 is inputted to the focusing motor control circuit 22 through the gate circuit 26, as in the embodiment shown in FIG. 4. Accordingly, the focusing motor 3 is driven in a one-way direction decided by the focusing motor control circuit 22. In such an initial state, the gate circuit 26 is maintained as closed. Thereafter, when it is determined by the peak detecting circuit 27 that data stored in the memory 32 is larger than that stored in the memory 31, that is, passes the maximal value of the focus evaluating value, in response to the output of the comparator circuit 25, the peak detecting circuit 27 generates a peak detection signal and applies the same to the gate circuit 26 and the focusing motor control circuit 22, as in the embodiment in FIG. 4. The gate circuit 26 is opened in response to the peak detection signal. In addition, the focusing motor control circuit 22 stops the focusing motor 3 in response to the peak detection signal and fixes the focusing ring 2 in the in-focus position. Furthermore, the output at that time of the maximum value detecting circuit 18 is stored in a memory 33, in synchronization with the rising edge of the peak detection signal from the peak detecting circuit 27. The newest maximum value obtained from the maximum value detecting circuit 18 and the maximum value held in the memory 33 are applied to the comparator circuit 29 where the data are compared. When the compared result exceeds a predetermined threshold value previously stored in the memory 30, it is determined that an object changes, so that the comparator circuit 29 applies the signal indicating that an object changes to the peak detecting circuit 27. The peak detecting circuit 27 is reset by the signal indicating that an object changes, and an output of the peak detection signal is inhibited. The gate circuit 26 is closed again, so that automatic focusing operation based on hill-climbing control is resumed by the focusing motor control circuit 22. More specifically, according to the embodiment in FIG. 5, it is determined that the focus evaluating value attains the maximal value in response to the output of the maximum value detecting circuit 18, so that the in-focus position can be more correctively detected and better automatic focusing operation can be achieved.

Although in the above described embodiment, the integration circuit 10 is of an analogue type, an integration circuit of a digital type which contains an A/D converter can be used.

In addition, although in the above described embodiment, a signal which takes the maximum value in the in-focus position is used as a focus evaluating value, control may be performed such that a signal which takes the minimum value in the in-focus position is used as a focus evaluating value, a circuit for detecting the minimum value is provided, and the minimal value of the detected value is maintained, in which case the same effect can be obtained.

Furthermore, although in the above described embodiment, a plurality of the newest successive focus evaluating values held in the focus evaluating value holding circuit 12 are used, the focus evaluating values are delayed by a predetermined period, for example, a period corresponding to several fields, in which case the same effect can be obtained.

Additionally, although in the above described embodiment, the maximum value detecting circuit detects the maximum value for every field, the maximum value may be detected once in a predetermined period, for example, every period corresponding to five fields, in which case there occurs particularly no problem on the actual image.

Additionally, since a digital signal is used in the circuit subsequent to the A/D converter 11, the circuit structure can be achieved in a software manner by a micro-processor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing circuit for automatically matching the focus in response to a video signal obtained from an image sensor, comprising:
    focus evaluating value detecting means for detecting a level of a high frequency component of the video signal obtained from the image sensor every constant period, converting the level into a focus evaluating value which takes the maximum value in the in-focus position or a focus evaluating value which takes the minimum value in the in-focus position, and sequentially supplying the same,
    first holding means connected to said focus evaluating value detecting means for holding a plurality of focus evaluating values successively obtained every said constant period,
    maximum value/minimum value detecting means for detecting the maximum value or the minimum value of said plurality of successively focus evaluating values held in said first holding means, and
    focus controlling means responsive to an output of said maximum value/minimum value detecting means for controlling the focus.

2. An automatic focusing circuit in accordance with claim 1, wherein said focus controlling means comprises means responsive to the output of said maximum value/minimum value detecting means for driving a focusing motor to move a focusing lens or the image sensor.

3. An automatic focusing circuit in accordance with claim 1, wherein said focus controlling means comprises means responsive to the output of said maximum value/minimum value detecting means for driving a piezoelectric element to move the focusing lens or the image sensor.

4. An automatic focusing circuit in accordance with claim 1, wherein the number of the focus evaluating values held in said first holding means is constant and the successive focus evaluating values held therein are sequentially updated every said constant period.

5. An automatic focusing circuit in accordance with claim 4, wherein said first holding means successively holds a plurality of the newest focus evaluating values obtained every said constant period.

6. An automatic focusing circuit in accordance with claim 4, wherein said first holding means successively holds a plurality of focus evaluating values a predetermined period before obtained every said constant period.

7. An automatic focusing circuit in accordance with claim 4, wherein said maximum value/minimum value detecting means selects the maximum value or the minimum value every said constant period.

8. An automatic focusing circuit in accordance with claim 4, wherein said maximum value/minimum value detecting means detects the maximum value or the minimum value once per a predetermined number of said constant periods.

9. An automatic focusing circuit in accordance with claim 7, wherein said focus controlling means comprises second holding means for holding the newest successive two detected values of the output of said maximum value/minimum value detecting means obtained every said constant period,
    first comparing means for comparing two detected values held in said second holding means, and
    means for detecting inversion of an output of said first comparing means and controlling the focus.

10. An automatic focusing circuit in accordance with claim 7, wherein said focusing controlling means comprises
    third holding means connected to said focus evaluating value detecting means for holding the newest successive two focus evaluating values obtained every said constant period,
    second comparing means for comparing two focus evaluating values held in said third holding means,
    means for detecting inversion of an output of said second comparing means and interrupting focus controlling,
    fourth holding means in synchronization with detection of inversion of the output of said second comparing means for holding the focus evaluating value at that time,
    third comparing means for comparing the newest detected value of the output of said maximum value/minimum value detecting means obtained said every constant period with a focus evaluating value held in said fourth holding means and comparing the difference with a predetermined threshold value, and
    means for determining that said difference exceeds said predetermined threshold value and resuming focus controlling.

11. An automatic focusing circuit in accordance with claim 7, wherein said focus controlling means comprises
    fifth holding means for holding the newest successive two detected values of the output of the maximum value/minimum value detecting means obtained every said constant period,
    fourth comparing means for comparing two detected values held in said fifth holding means,
    means for detecting inversion of an output of said fourth comparing means and interrupting focus controlling,
    sixth holding means synchronized with detection of inversion of the output of said fourth comparing means and holding the output at that time of said maximum value/minimum value detecting means,
    fifth comparing means for comparing the newest detected value of the output of said maximum value/minimum value detecting means obtained every said constant period with a focus evaluating value held in said sixth holding means and comparing the difference with a predetermined threshold value, and
    means for determining that said difference exceeds said predetermined threshold value and resuming focus controlling.

12. An automatic focusing circuit in accordance with claim 1, wherein said constant period comprises a period corresponding to one field of said video signal.

13. An automatic focusing circuit in accordance with claim 1, wherein said constant period comprises a period corresponding to one frame of said video signal.

14. An automatic focusing circuit in accordance with claim 1, wherein said focus evaluating value detecting means comprises
   synchronizing signal separating means for separating a vertical synchronizing signal and a horizontal synchronizing signal from said video signal, and
   gate means responsive to said vertical synchronizing signal and said horizontal synchronizing signal separated from said synchronizing signal separating means for setting a sampling area for detecting a level of a high frequency component of said video signal every said constant period.

15. An automatic focusing circuit in accordance with claim 1, wherein said focus evaluating value detecting means comprises
   integrating means for integrating the level of the high frequency component of said video signal detected every said constant period, and
   analog/digital converting means for converting an output of said integrated means into a digital value.

16. An automatic focusing circuit in accordance with claim 4, wherein said first holding means comprises memories the number of which is the same as that of the focus evaluating values which can be held.

17. An automatic focusing circuit in accordance with claim 16, wherein said memories are coupled in series, and said successive focus evaluating values are sequentially transferred through said memories every said constant period.

18. An automatic focusing circuit in accordance with claim 16, wherein said memories are coupled in parallel, and said successive focus evaluating values are sequentially applied to each memory every said constant period.

19. An automatic focusing circuit in accordance with claim 1, wherein said maximum value/minimum value detecting means serves for delivering an output corresponding to the value of the detected maximum or minimum value.

20. An automatic focusing circuit in accordance with claim 1, wherein said maximum value/minimum value detecting means serves for selecting the maximum value or the minimum value of said plurality of successive focus evaluating values from said focus value detecting means and held in said first holding means and for delivering an output corresponding to the selected maximum or 21. An automatic focusing circuit for automatically matching the focus in response to a video signal obtained from an image sensor, comprising:
   focus evaluating value detecting means for detecting a level of a high frequency component of the video signal obtained from the image sensor every constant period, converting the level into a focus evaluating value which takes the maximum value in the in-focus position, and sequentially supplying the same,
   first holding means connected to said focus evaluating value detecting means for holding a plurality of focus evaluating values successively obtained every said constant period,
   maximum value detecting means for detecting the maximum value of said plurality of successive focus evaluating values held in said first holding means, and
   focus controlling means responsive to an output of said maximum value detecting means for controlling the focus.

22. An automatic focusing circuit in accordance with claim 21, wherein said focus controlling means comprises means responsive to the output of said maximum value detecting means for driving a focusing motor to move a focusing lens or the image sensor.

23. An automatic focusing circuit in accordance with claim 21, wherein said focus controlling means comprises means responsive to the output of said maximum value detecting means for driving a piezoelectric element to move the focusing lens or the image sensor.

24. An automatic focusing circuit in accordance with claim 21, wherein the number of the focus evaluating values held in said first holding means is constant and the successive focus evaluating values held therein are sequentially updated every said constant period.

25. An automatic focusing circuit in accordance with claim 24, wherein said first holding means successively holds a plurality of the newest focus evaluating values obtained every said constant period.

26. An automatic focusing circuit in accordance with claim 24, wherein said first holding means successively holds a plurality of focus evaluating values a predetermined period before obtained every said constant period.

27. An automatic focusing circuit in accordance with claim 24, wherein said maximum value detecting means detects the maximum value every said constant period.

28. An automatic focusing circuit in accordance with claim 24, wherein said maximum value detecting means detects the maximum value once per a predetermined number of said constant periods.

29. An automatic focusing circuit in accordance with claim 27, wherein said focus controlling means comprises
   second holding means for holding the newest successive two detected values of the output of said maximum value detecting means obtained every said constant period,
   first comparing means for comparing two detected values held in said second holding means, and
   means for detecting inversion of an output of said first comparing means and controlling the focus.

30. An automatic focusing circuit in accordance with claim 27, wherein said focus controlling means comprises
   third holding means connected to said focus evaluating values detecting means for holding the newest successive two focus evaluating values obtained every said constant period,
   second comparing means for comparing two focus evaluating values held in said third holding means,
   means for detecting inversion of an output of said second comparing means and interrupting focus controlling,
   fourth holding means in synchronization with detection of inversion of the output of said second comparing means for holding the focus evaluating value at that time,
   third comparing means for comparing the newest detected value of the output of said maximum value detecting means obtained said every constant period with a focus evaluating value held in said fourth holding means and comparing the difference with a predetermined threshold value, and means for determining that said difference exceeds said predetermined threshold value and resuming focus controlling.

31. An automatic focusing circuit in accordance with claim 27, wherein said focus controlling means comprises fifth holding means for holding the newest successive two detected values of the output of the maximum value detecting means obtained every said constant period, fourth comparing means for comparing two detected values held in said fifth holding means, means for detecting inversion of an output of said fourth comparing means and interrupting focus controlling, sixth holding means synchronized with detection of inversion of the output at that time of said maximum value detecting means, fifth comparing means for comparing the newest detected value of the output of said maximum value detecting means obtained every said constant period with a focus evaluating value held in said sixth holding means and comparing the difference with a predetermined threshold value, and means for determining that said difference exceeds said predetermined threshold value and resuming focus controlling.

32. An automatic focusing circuit in accordance with claim 21, wherein said constant period comprises a period corresponding to one frame of said video signal.

33. An automatic focusing circuit in accordance with claim 21, wherein said focus evaluating value detecting means comprises synchronizing signal separating means for separating a vertical synchronizing signal and a horizontal synchronizing signal from said video signal, and gate means responsive to said vertical synchronizing signal and said horizontal synchronizing signal separated from said synchronizing signal separating means for setting a sampling area for detecting a level of a high frequency component of said video signal every said constant period.

34. An automatic focusing circuit in accordance with claim 21, wherein said focus evaluating value detecting means comprises integrating means for integrating the level of the high frequency component of said video signal detected every said constant period, and analog/digital converting means for converting an output of said integrated means into a digital value.

35. An automatic focusing circuit in accordance with claim 21, wherein said first holding means comprises memories the number of which is the same as that of the focus evaluating values which can be held.

36. An automatic focusing circuit in accordance with claim 35, wherein said memories are coupled in series, and said successive focus evaluating values are sequentially transferred through said memories every said constant period.

37. An automatic focusing circuit in accordance with claim 35, wherein said memories are coupled in parallel, and said successive focus evaluating values are sequentially inputted to each memory every said constant period.

38. An automatic focusing device for focusing an image on an image sensor, comprising:

video signal processing means for processing a video signal from the image sensor over a given time period so as to obtain, for every time period, a focus signal whose amplitude indicates closeness to an in-focus condition;

focus control means for producing a focus control signal; and selecting means coupled to said processing means and to said focus control means for selecting one of a plurality of the focus signals over a given plurality of the time periods on the basis of the closeness to the in-focus condition that the amplitude of the signal indicates, and for supplying the selected signal in each of the plurality of time periods to said focus control means.

* * * * *